United States Patent
Suh et al.

(10) Patent No.: US 9,209,869 B2
(45) Date of Patent: Dec. 8, 2015

(54) SYSTEM AND METHOD FOR TRELLIS CODED QUANTIZATION WITH SELECTIVE FEEDBACK AND INTERPOLATION

(71) Applicant: Huawei Technologies Co., Ltd., Shenzhen (CN)

(72) Inventors: Junghoon Suh, Kanata (CA); Jiayin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/070,233

(22) Filed: Nov. 1, 2013

(65) Prior Publication Data

US 2015/0124894 A1   May 7, 2015

(51) Int. Cl.
 *H04K 1/10* (2006.01)
 *H04B 7/04* (2006.01)
 *H04B 7/02* (2006.01)

(52) U.S. Cl.
 CPC .............. *H04B 7/0417* (2013.01); *H04B 7/024* (2013.01)

(58) Field of Classification Search
 None
 See application file for complete search history.

(56) References Cited

U.S. PATENT DOCUMENTS

| 8,295,379 | B2 * | 10/2012 | Au-Yeung et al. | ............ 375/265 |
| 2009/0023467 | A1 * | 1/2009 | Huang et al. | .................. 455/522 |
| 2013/0195167 | A1 | 8/2013 | Suh et al. | |

OTHER PUBLICATIONS

Ungerboeck, G., "Channel Coding with Mulitlevel/Phase Signals," IEEE Transactions on Information Theory, vol. IT-28, No. 1, Jan. 1982, pp. 55-67.
Marcellin, M. W., et al., "Trellis Coded Quantization of Memoryless and Gauss-Markov Sources," IEEE Transactions on Communications, vol. 38, No. 1, Jan. 1990, pp. 82-93.
Zhang, J., et al., "Trellis-Coded Quantization of Phases in MISO Wireless Systems," Telkomnika, vol. 10, No. 7, Nov. 2012, pp. 1808-1814.
Watson, et al., "Understanding the IEEE 802.11ac Wi-Fi Standard, Preparing for the next gen of WLAN," Meru Networks, Jul. 2013, 9 pages.

* cited by examiner

*Primary Examiner* — Adolf Dsouza
(74) *Attorney, Agent, or Firm* — Slater & Matsil, LLP

(57) ABSTRACT

A method for providing channel feedback includes receiving a signal from a transmission point (TP), estimating channel parameters from the signal as received, mapping the estimated channel parameters to a trellis in accordance with a Trellis Coded Quantization (TCQ) scheme, and applying a Viterbi algorithm (VA) to the trellis to generate quantized channel parameters, the quantized channel parameters including a plurality of samples. The method also includes identifying samples of the estimated channel parameters associated with samples of quantized channel parameters having quantization errors above a predetermined threshold, generating indicators in accordance with the samples having the quantization error above the predetermined threshold, and transmitting, by the RP, the quantized channel parameters and the indicators to the TP.

23 Claims, 8 Drawing Sheets

$$\pm (2n-1)/256, n = 1, 2, \ldots, 128,$$

SYSTEM AND METHOD FOR TRELLIS CODED QUANTIZATION WITH SELECTIVE FEEDBACK AND INTERPOLATION

TECHNICAL FIELD

The present disclosure relates generally to digital communications, and more particularly to a system and method for trellis coded quantization (TCQ) with selective feedback and interpolation.

BACKGROUND

New technologies such as coordinated multi-point (CoMP), interference alignment (IA), dirty paper coding (DPC), massive multiple-input multiple-output (MIMO), and the like, may be some of the keys to capacity enhancement for wireless communications systems. However, all of the benefits provided by these technologies may not be realized due to the requirements for precise channel knowledge. For example, current channel feedback schemes in current technical standards, such as IEEE 802.11ac, limit the transmission (Tx) beamforming (BF) design, especially for multi-user (MU) multiple input multiple output (MIMO) systems. However, full channel state information (CSI) knowledge is necessary at the scheduler in order to apply advanced BF schemes such as those designed in non-linear precoder design methods for MU-MIMO or CoMP-like systems.

SUMMARY OF THE DISCLOSURE

Example embodiments of the present disclosure which provide a system and method for trellis coded quantization (TCQ) with selective feedback and interpolation.

In accordance with an example embodiment of the present disclosure, a method for channel feedback is provided. The method includes receiving, by a reception point (RP), a signal from a transmission point (TP), estimating, by the RP, channel parameters from the signal as received, and mapping, by the RP, the estimated channel parameters to a trellis in accordance with a Trellis Coded Quantization (TCQ) scheme. The method includes applying, by the RP, a Viterbi algorithm (VA) to the trellis to generate quantized channel parameters, the quantized channel parameters including a plurality of samples, identifying, by the RP, samples of the estimated channel parameters associated with samples of quantized channel parameters having quantization errors above a predetermined threshold, generating, by the RP, indicators in accordance with the samples having the quantization error above the predetermined threshold, and transmitting, by the RP, the quantized channel parameters and the indicators to the TP.

In accordance with another example embodiment of the present disclosure, a method for operating a transmission point (TP) is provided. The method includes receiving, by the TP, channel information for a communications channel, the channel information including quantized channel parameters and indicators of identified samples of estimated channel parameters having quantization errors above a predetermine threshold, and generating, by the TP, reconstructed channel parameters from the quantized channel parameters. The method also includes interpolating, by the TP, replacement samples for the identified samples, and replacing, by the TP, the identified samples in the reconstructed channel parameters with the replacement samples to produce recovered channel parameters of the communications channel.

In accordance with another example embodiment of the present disclosure, a reception point is provided. The reception point includes a receiver, a processor operatively coupled to the receiver, and a transmitter operatively coupled to the processor. The receiver receives a signal from a transmission point (TP). The processor estimates channel parameters from the signal as received, maps the estimated channel parameters to a trellis in accordance with a Trellis Coded Quantization (TCQ) scheme, applies a Viterbi algorithm (VA) to the trellis to generate quantized channel parameters, the quantized channel parameters including a plurality of samples, identifies samples of the estimated channel parameters associated with samples of quantized channel parameters having quantization errors above a predetermined threshold, and generates indicators in accordance with the samples having the quantization error above the predetermined threshold. The transmitter transmits the quantized channel parameters and the indicators to the TP.

In accordance with another example embodiment of the present disclosure, a transmission point is provided. The transmission point includes a receiver, and a processor operatively coupled to the receiver. The receiver receives channel information for a communications channel, the channel information including quantized channel parameters and indicators of identified samples of estimated channel parameters having quantization errors above a predetermine threshold. The processor generates reconstructed channel parameters from the quantized channel parameters, interpolates replacement samples for the identified samples, and replaces the identified samples in the reconstructed channel parameters with the replacement samples to produce recovered channel parameters of the communications channel.

One advantage of an embodiment is that with the example embodiments, the amount of feedback information required to be provided to a transmission point is a fraction of the feedback information required for full channel state information. Therefore, communications overhead is reduced with maintaining the channel knowledge necessary for advanced BF schemes.

A further advantage of an embodiment is that samples of channel parameters with high quantization error are marked for replacement, which may occur at the transmission point using interpolation techniques. Eliminating the high quantization error samples helps to improve overall communications system performance by reducing total error present in the channel knowledge.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to TCQ with selective feedback and interpolation. For example, a reception point receives a signal from a transmission point (TP), estimates channel parameters from the signal as received, maps the estimated channel parameters to a trellis in accordance with a Trellis Coded Quantization (TCQ) scheme, applies a Viterbi algorithm (VA) to the trellis to generate quantized channel parameters, the quantized channel parameters including a plurality of samples, identifies samples of the estimated channel parameters associated with samples of quantized channel parameters having quantization errors above a predetermined threshold, generates indicators in accordance with the samples having the quantization error above the predetermined threshold, and transmits the quantized channel parameters and the indicators to the TP. As another example, a transmission point receives channel information for a communications channel, the channel information including quantized channel parameters and indicators of identified samples of estimated channel parameters having quantization errors above a predetermine threshold, generates reconstructed channel parameters from the quantized channel parameters, interpolates replacement samples for the identified samples, and replaces the identified samples in the reconstructed channel parameters to produce recovered channel parameters of the communications channel.

The present disclosure will be described with respect to example embodiments in a specific context, namely communications systems that use channel state information to facilitate advanced BF techniques or advanced communications techniques. The disclosure may be applied to standards compliant communications systems, such as those that are compliant with Third Generation Partnership Project (3GPP), IEEE 802.11, and the like, technical standards, and non-standards compliant communications systems, that use channel state information to facilitate advanced BF techniques or advanced communications techniques.

Figure 1:
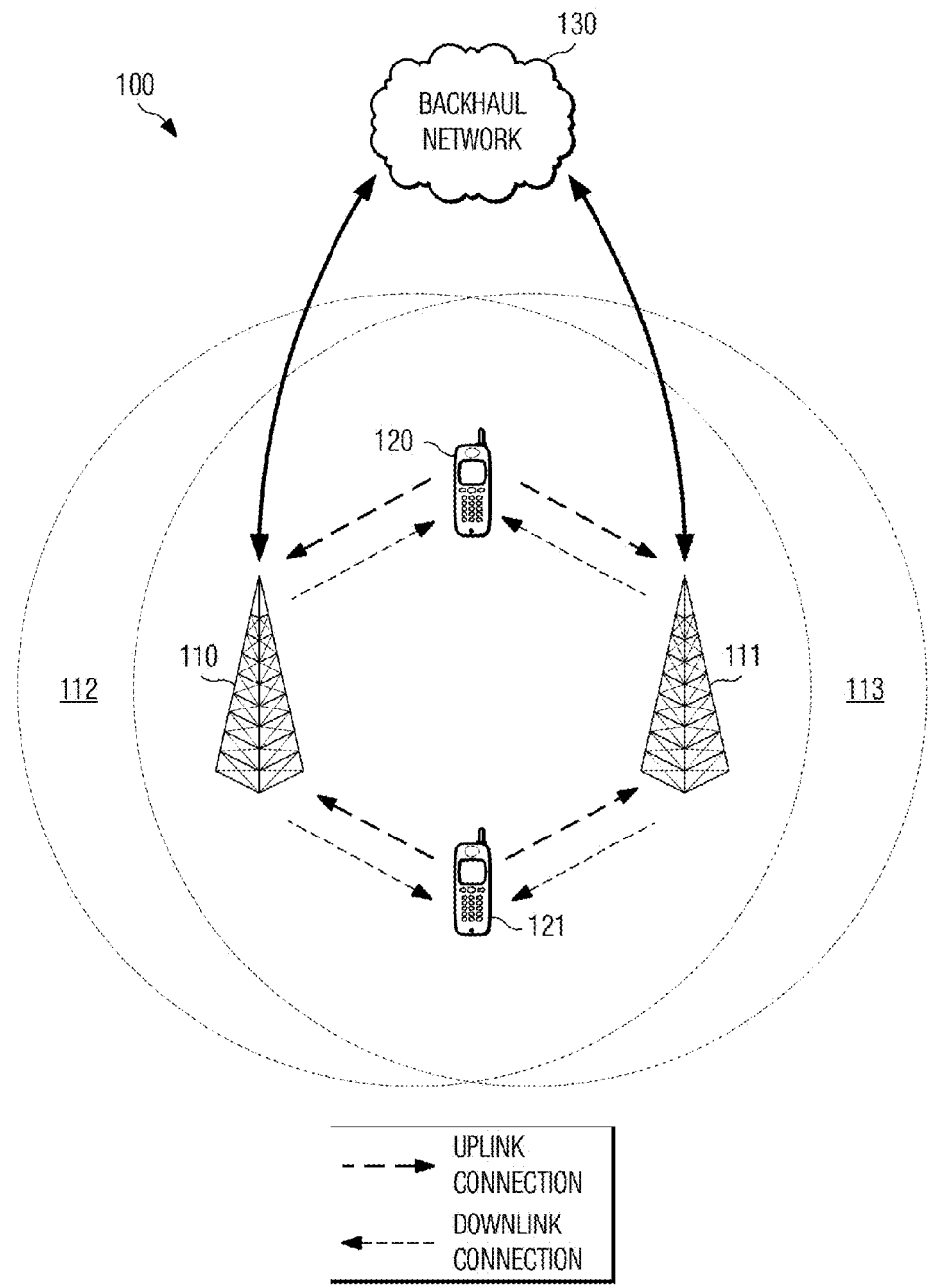
FIG. 1 illustrates an example communications system according to example embodiments described herein.

FIG. 1 illustrates an example communications system 100. Communications system 100 includes access points (APs), such as AP 110 and AP 111. As shown in FIG. 1, the APs have overlapping coverage areas (coverage area 112 corresponding to AP 110 and coverage area 113 corresponding to AP 111). The APs may serve stations, such as station 120 and station 121. Utilizing advanced communications techniques, a device may communicate with multiple APs. As shown in FIG. 1, station 120 may communicate with both AP 110 and AP 111. Similarly, station 121 may communicate with both AP 110 and AP 111. Communications from an AP to a station is referred to as downlink (DL) communications and communications from a station to an AP is referred to as uplink (UL) communications. The APs may be connected to a backhaul network 130, which may provide functionality support such as mobility, authentication, authorization, and the like, as well as services, including data, information, multimedia, and the like. In general, an AP may also be commonly referred to as a base station, a NodeB, an evolved NodeB (eNB), a controller, a communications controller, and the like. Similarly, a station may also be commonly referred to as a mobile station, a mobile, a subscriber, a user, a terminal, a user equipment (UE), and the like.

While it is understood that communications systems may employ multiple APs capable of communicating with a number of stations, only two APs, and a number of UEs are illustrated for simplicity.

Figure 2:
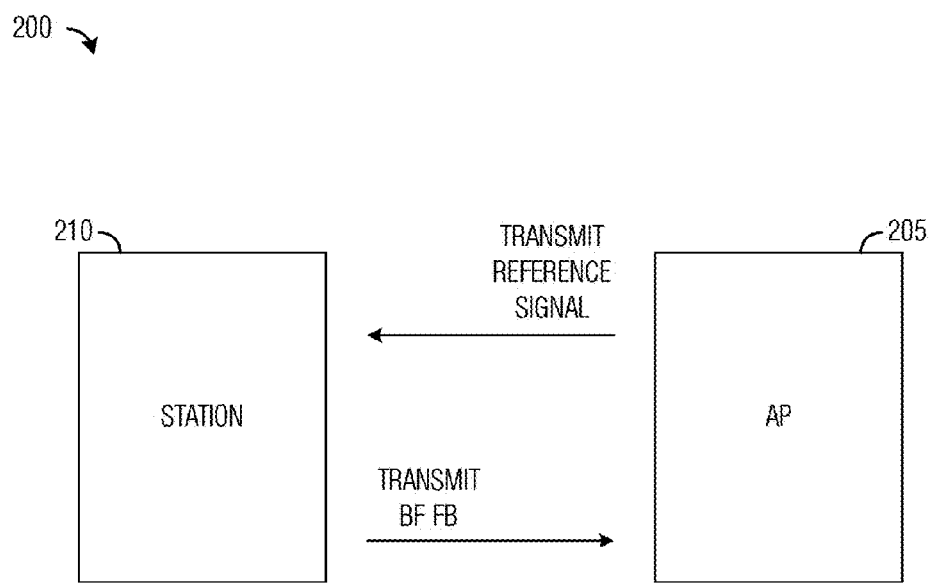
FIG. 2 illustrates an example communications system highlighting channel state information feedback according to example embodiments described herein.

FIG. 2 illustrates an example communications system 200, highlighting channel state information feedback. Generally, in order to obtain channel state information, a transmission point (such as an AP 205 when it is transmitting to a station 210 in a downlink or station 210 when it is transmitting to AP 205 in an uplink) transmits to a reception point over a communications channel (or link) and the reception point utilizes the transmission to measure the communications channel. The reception point uses the channel measurement to derive channel state information and transmits the channel state information (or a function thereof or a function thereof) to the transmission point. The channel state information may be referred to as channel feedback (channel FB). The transmission point may use the channel FB to adjust its transmitter to fully exploit advanced communications techniques, such as BF, CoMP, MU-MIMO, single user MIMO, and the like.

In general, transmission points that want to use advanced communications techniques need to know about the communications channels, such as MIMO channels, for transmitter beamforming (TxBF). This is especially true when advanced communications techniques, such as non-linear precoded MIMO, are to be applied, since full channel knowledge needs to be known at the transmission points. However, cost is an issue. The more accurate the channel knowledge, the larger the size of the channel feedback. Thereby increasing communications overhead and reducing communications system efficiency.

Co-assigned U.S. patent application Ser. No. 13/947,721, filed Jul. 22, 2013, entitled "Systems and Methods for Trellis Coded Quantization Based Channel Feedback," which is incorporated herein by reference, discloses the use of TCQ to quantize channel feedback. The use of TCQ helps to reduce the size of the channel feedback to about 10% of the current specified IEEE 802.11n full channel knowledge feedback size while still accommodating the application of any kind of MIMO beamforming technique including even dirty paper coding (DPC), one of the most complicated non-linear type of MIMO precoding techniques.

According to an example embodiment, some forms of beamforming are more sensitive to channel estimation errors than others. Therefore, it may be advantageous to optimize the trellis technique, branch labeling, as well as normalization of the estimated channel. Furthermore, quantizing the channel feedback using TCQ may be updated to include selective feedback and sample interpolation to improve the performance of the communications system.

According to an example embodiment, a significant source of channel estimation error is quantization error. With the TCQ technique, it is possible to determine quantization errors in the channel feedback prior to actually feeding back the channel feedback. Therefore, it may be possible to determine the quantization error in the channel feedback after application of TCQ and identify the quantized data with large quantization errors. At the transmission point, the channel knowledge corresponding to the quantized data with large quantization errors may be replaced with interpolated data, thereby improving the channel knowledge.

Figure 3:
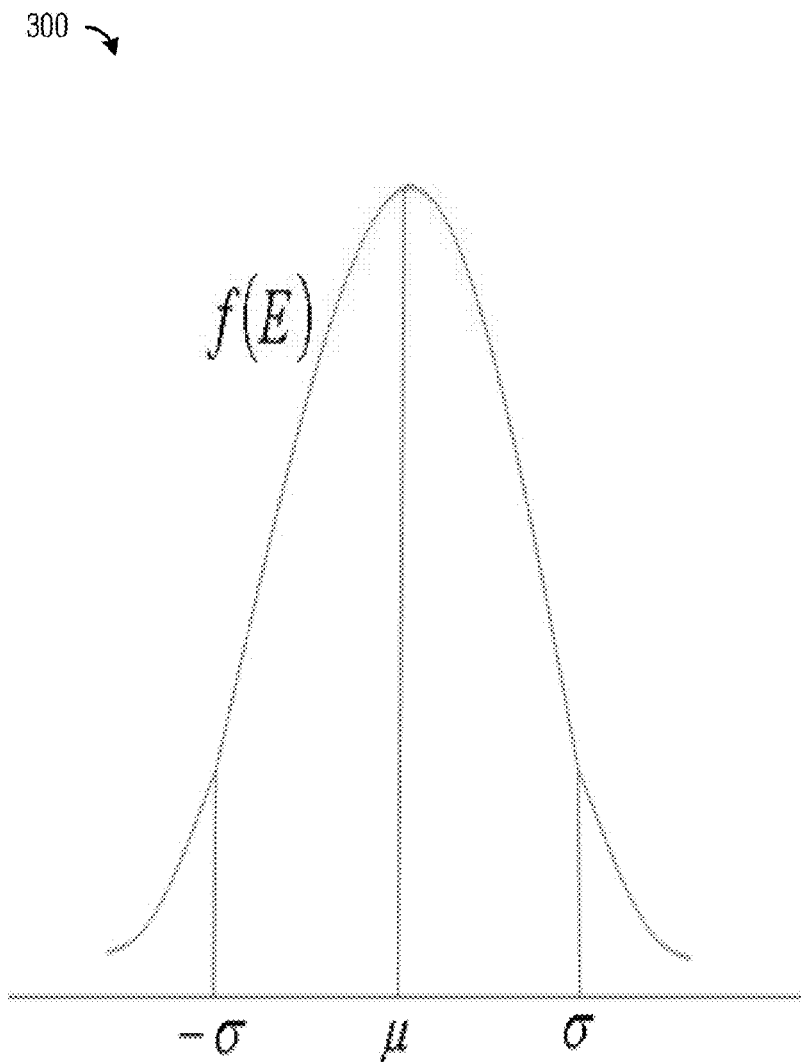
FIG. 3 illustrates an example probability distribution function of quantization error according to example embodiments described herein.

FIG. 3 illustrates an example probability distribution function 300 of quantization error. Probability distribution function (PDF) 300 may illustrate the distribution of quantization error present in channel parameters after quantization using the TCQ technique. PDF 300 has an average μ and a standard deviation σ. Quantized values with quantization error greater than (or less than) a threshold, such as σ or −σ, may be deemed to have too much quantization error and may contribute to poor performance in forms of beamforming that are sensitive to channel estimation errors. Such quantized values may be identified for replacement through the use of techniques such as interpolation at the transmission point.

Figure 4:
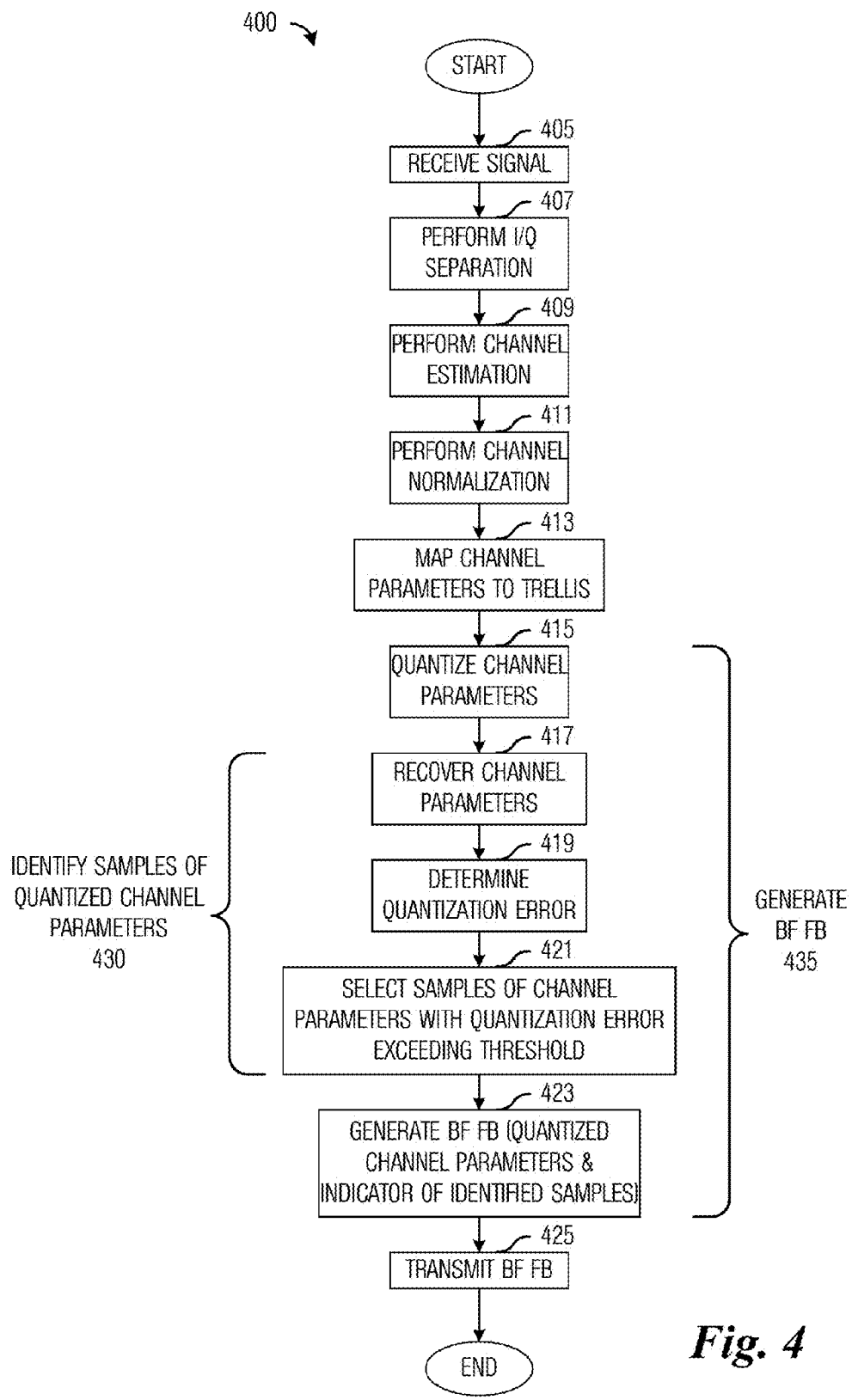
FIG. 4 illustrates an example flow diagram of operations occurring in a reception point as the receiving station provides channel feedback to a transmission point according to example embodiments described herein.

FIG. 4 illustrates an example flow diagram of operations 400 occurring in a reception point as the receiving station provides channel feedback to a transmission point. Operations 400 may be indicative of operations occurring in a reception point, such as a UE or station in a downlink transmission or an eNB or AP in an uplink transmission, as the reception point provides channel feedback to a transmission point, such as an eNB or AP in a downlink transmission or a UE or station in an uplink transmission.

Operations 400 may begin with the reception point receiving a signal transmitted by the transmission point (block 405). The signal may be a reference signal that is known to the reception point that is transmitted by the transmission point to assist the reception point in making its measurement of the channel. Alternatively, the signal may be regular transmissions from the transmission point that the reception point may receive over time. The reception point may separate the signal into its Real (I) and Imaginary (Q) parts (block 407).

The reception point may estimate the channel (block 409). The reception point may use the signal transmitted by the transmission point to measure the channel. Since the signal transmitted by the transmission point is known by the reception channel (e.g., the reception point knows the transmit power level, as well as properties of the signal), the reception point may be able to estimate the channel using the signal and the measurement of the channel, producing estimated channel parameters. It is noted that there may be two sets of estimated channel parameters, one for the real part and one for the imaginary part.

The reception point may normalize the estimated channel parameters (block 411). The normalization of the estimated channel parameters may be performed using multiple input single output (MISO) based reception at the reception point, that is, the estimated channel paths ($\bar{h}$) per each receive antenna (RX) for all transmit antenna (TX) may be normalized with the norm of the channel vector $\bar{h}$, hence the normalized channel parameters are expressible as $$\frac{\bar{h}}{|\bar{h}|}.$$

The normalized channel parameters may be mapped onto a trellis utilizing the TCQ technique (block 413). As an illustrative example, the trellis may be described with a forward state transition function expressible as $S_i(S_{i-1}/4)+64*u_i$, where index i represents the trellis stage index. Thus $S_i$ represents a node (state) at the i-th stage. Furthermore, $u_i$ represents the input bits, where two bits are assigned for an input with the four branch paths per node (state) emanated. Hence, $u_i$ is typically an integer ranging from 0 to 3. Each trellis stage corresponds to a channel parameter per sub-carrier, per real or imaginary part, and per a channel (link) between a single TX and a single RX. Additionally, a backward state transition is expressible as $S_{i-1}=(S_i*4)\%64+u_b$, where $u_b$ is the survival branch information for the backward trellis transition.

Figure 6:
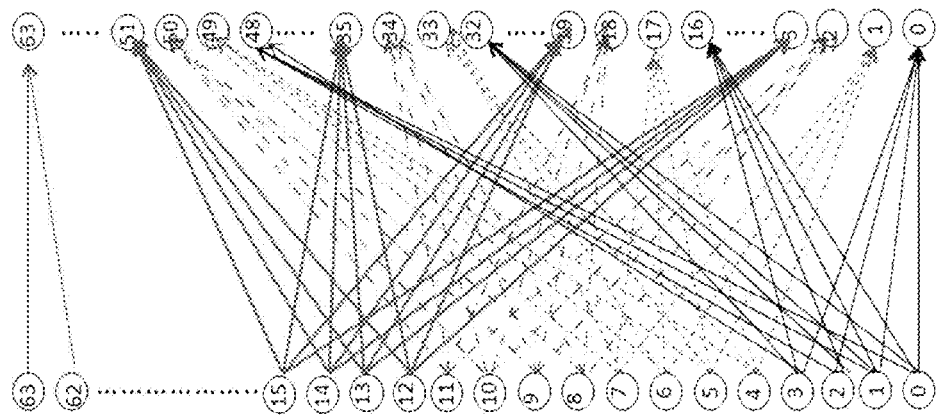
FIG. 6 illustrates an example trellis diagram according to example embodiments described herein.
Figure 5:
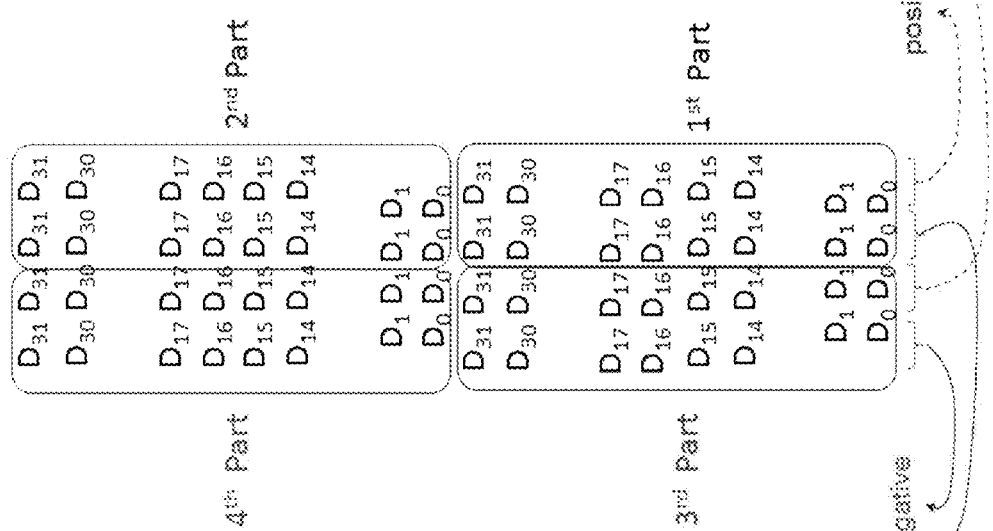
FIG. 5 illustrates an example branch mapping of a trellis according to example embodiments described herein.

FIG. 5 illustrates an example branch mapping of a trellis. FIG. 6 illustrates an example trellis diagram. The four incoming branches of a node compete with each other and one branch out of the four incoming branches will survive. Branch labels may be chosen in such a way to make the quantization level distributed as sparse as possible over all the states, that is, the four branches coming out of a node should be chosen so that the distances among them is maximized.

Figure 7A:
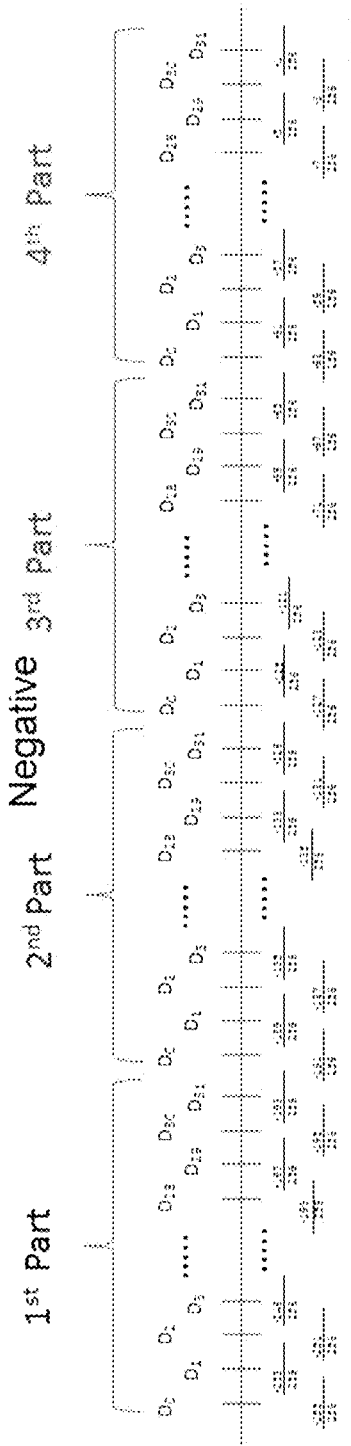
FIGS. 7a and 7b illustrate example branch labels for negative and positive portions of a trellis, respectively according to example embodiments described herein.
Figure 7B:
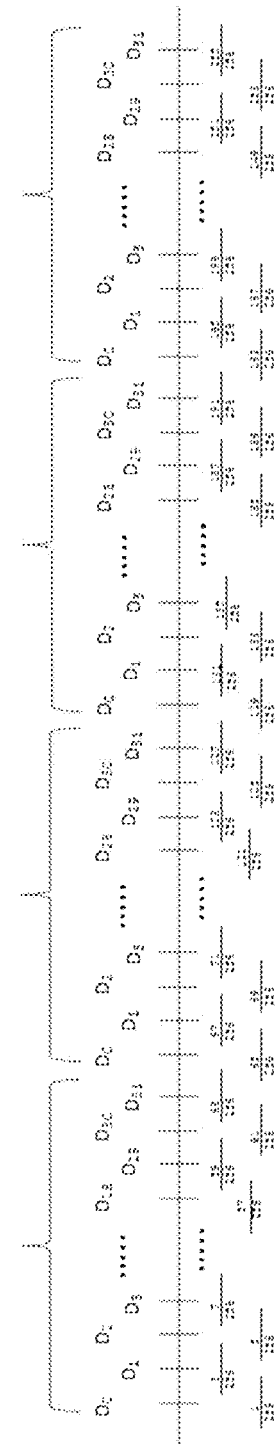

An example trellis has a total of 256 branches. Although the discussion focuses on a 256 branch trellis, the example embodiments are also operable with other trellis sizes and designs. There are 256 scalar quantization points, which are expressible as $$Q(S_i,B_i)=\pm(2n-1)/256, n=1,2,\ldots,128,$$

where $S_i$ and $B_i$ represent the state and the branch index at the i-th trellis stage, respectively. Additionally, the branches may be labeled as $\sin((\pi/2)*Q)/\sqrt{N_{TX}/2}$, where $N_{TX}$ is the number of TX antennas, and Q is the 256 scalar quantization points already mapped onto each state and each branch. Therefore, the expression $\sin((\pi/2)*Q)/\sqrt{N_{TX}/2}$ becomes the final branch label per each state and each branch in accordance with the Q mapping onto the branch. FIGS. 7a and 7b illustrate example branch labels for negative and positive portions of a trellis, respectively.

According to an example embodiment, the quantization levels and branch mappings for a trellis may be selected to maximize a distance among the four branches coming out of a trellis node. In general, having equal distances apart among the four branches will maximize the distance for all branches of the trellis, thereby distributing the quantization level in as sparse a manner as possible over all states. As an illustrative example, the uniformly distributed angle quantization prior to application of a Sine function (sin( )) and then mapped onto the four branches exiting Node 0 (state 0) and Node 1 (state 1) are −127/256, 129/256, −255/256, 1/256 and −125/256, 131/256, −253/256, 3/256, respectively. The distances among the four branches are equal and maximized.

Referring back now to FIG. 4, the reception point may quantize the normalized channel parameters to produce quantized channel parameters (the outputs of the trellis) (block 415). According to an example embodiment, the quantization of the channel parameters may be achieved using a Viterbi algorithm (VA) that corresponds to the TCQ technique. The VA used may be specific to the trellis selected for use in the TCQ technique. As an illustrative example, the size (e.g., number of states, and number of branches), quantization levels, branch mappings, and the like, may determine a VA used.

The reception point may recover the channel parameters to produce recovered channel parameters (block 417). The reception point may recover the channel parameters from the quantized channel parameters. In other words, the reception point may reverse the quantization process of block 415 to recover the channel parameters. It is noted that since the quantization process may introduce quantization noise (see FIG. 3 and related discussion), it may be unlikely for the channel parameters recovered from the quantized channel parameters (referred to as recovered channel parameters) will be exactly equal to the channel parameters prior to quantization (i.e., the estimated channel parameters). The reception point may use a convolutional encoder to recover the channel parameters from the quantized channel parameters. The convolutional encoder used may be the same as a convolutional encoder used by a transmission point to recover the channel parameters from channel feedback that it receives from the reception point.

The reception point may determine quantization error for the estimated channel parameters (block 419). The reception point may compare the estimated channel parameters to the recovered channel parameters to determine the quantization error for the estimated channel parameters. There may be a quantization error for each sample of the estimated channel parameters.

The reception point may select samples of the estimated channel parameters with quantized channel parameters having quantization error that exceeds a threshold (block 421). As discussed previously, each sample of the estimated channel parameters may have its own quantization error. Generally, the quantization error will follow a Gaussian distribution, such as shown in FIG. 3. Usually, most of the samples will have quantization errors that are relatively close to the mean μ. However, some of the samples will have quantization errors that exceed a threshold (such as σ). These samples may be determined to be samples with quantization error that exceeds a threshold (σ). The threshold may be determined using numerical methods, for example, that represents a good trade off in quantization error versus interpolation error.

While it may be possible to simply select samples with quantization error that exceed the threshold, another technique may involve selecting samples with quantization error that exceed a certain percentile of other samples. As an illustrative example, samples with quantization error that exceed X percentile of quantization error for other samples, where X is a threshold and may be a numerical value such as 25, 50, 60, 70, 75, and the like. In general, X may be a numerical value determined using numerical methods, for example, that represents a good trade off in quantization error versus interpolation error.

As an illustrative example, the reception point may sort the samples of the estimated channel parameters in accordance with the quantization error of their associated quantized channel parameters. The reception point may identify samples of the estimated channel parameters with quantized channel parameters having quantization error that exceeds the threshold X, where X is a number representing a quantization error percentile, such as discussed above.

Collectively, blocks 417, 419, and 421 may be referred to as identifying samples of the estimated channel parameters with quantized channel parameters having quantization errors that exceed a threshold (blocks 430).

The reception point may generate the channel feedback, e.g., the BF FB (block 423). The channel feedback may include the quantized channel parameters. Additionally, since the reception point has identified samples of the estimated channel parameters with quantization errors that exceed a threshold, the reception point may provide information about the identified samples of the estimated channel parameters to the transmission point. Due to the fact that a sample may have either been identified as being a sample with quantization error exceeding a threshold or not, a single bit indicator may be used for each sample. As an example, if a sample has been identified as a sample with quantization error exceeding a threshold, an indicator associated with a sample is set to a first value (e.g., a 1 or a true value). Similarly, if the sample has not been identified as a sample with quantization error exceeding the threshold, the indicator may be set to a second value (e.g., a 0 or a false value). Since there may be a plurality of samples, there may be a plurality of indicators (e.g., one indicator per sample). Therefore, the channel feedback may include the quantized channel parameters and the plurality of indicators. The channel feedback may also include initial state information, which is used to indicate an initial state of the trellis. The size of the initial state information depends on the number of states in the trellis (e.g., 6 bits are required to represent 64 states, or 8 bits are required to represent 256 states). Collectively, blocks 415, 417, 419, 421, and 423 may be referred to as generating BF FB. The reception point may transmit the channel feedback (block 425).

It is noted that the quantization of the estimated channel parameters using the VA and the recovery of the channel parameters using the convolutional encoding may be performed in a sequential manner, with the VA providing the quantized channel parameters and the convolutional encoder providing the recovered channel parameters. Both the VA and the convolutional encoder may correspond to the TCQ technique utilized, as well as the trellis selected for use in the TCQ technique.

Figure 8:
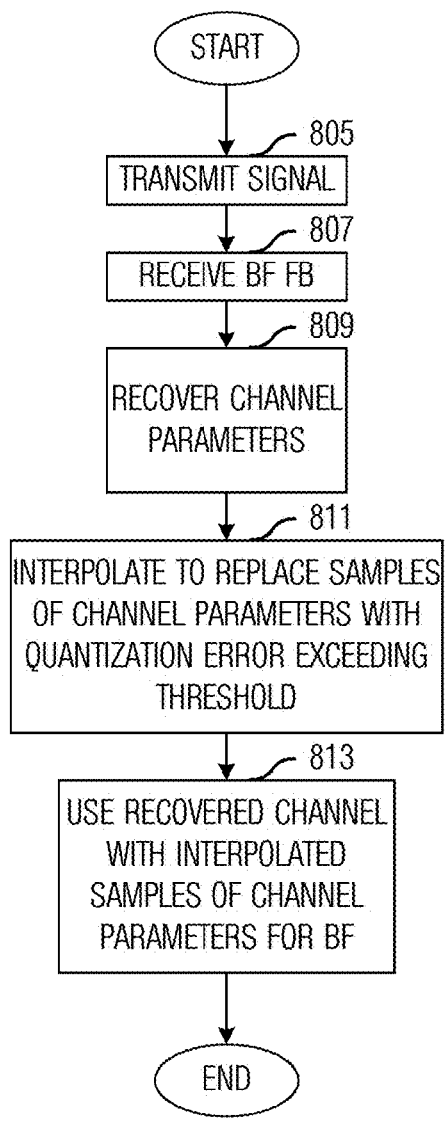
FIG. 8 illustrates an example flow diagram of operations occurring in a transmission point as the transmission point receives channel feedback and uses the channel feedback for beamforming according to example embodiments described herein.

FIG. 8 illustrates a flow diagram of operations 800 occurring in a transmission point as the transmission point receives channel feedback and uses the channel feedback for beamforming. Operations 800 may be indicative of operations occurring in a transmission point, such as an eNB or AP in a downlink transmission or a UE or station in an uplink transmission, as the transmission point receives channel feedback and uses the channel feedback for beamforming.

Operations 800 may begin with the transmission point transmitting a signal (block 805). The signal may be a reference signal that is known by the reception point to assist the reception point in making measurements of a channel between the transmission point and the reception point. Alternatively, the signal may be regular transmissions from the transmission point to the reception point.

The transmission point may receive channel feedback from the reception point (block 807). The channel feedback may include quantized channel parameters of the channel between the transmission point and the reception point. If MIMO is used, there may be quantized channel parameters for each link between each transmit antenna of the transmission point and each receive antenna of the reception point. The channel feedback may also include a plurality of indicators, with each indicator associated with a sample of the channel parameters. The indicators indicating whether or not the reception point has identified an associated sample of the channel parameter as having a corresponding quantized sample with quantization error that exceeds a threshold. The channel feedback may also include initial state information, which is used to indicate an initial state of the trellis.

The transmission point may recover channel parameters from the quantized channel parameters (block 809). The transmission point may recover the channel parameters (referred to as recovered channel parameters) using a convolutional encoder. According to an example embodiment, the convolutional encoder used by the transmission point uses the same design as the convolutional encoder used by the reception point.

The transmission point may use interpolation techniques to construct replacements for samples of the recovered channel parameters that have been identified as having quantization error exceed a threshold (block 811). The transmission point may use any interpolation technique to construct the replacements. The recovered channel parameters with the replacement samples may be used to adjust a transmitter of the transmission point for a transmission to the reception point (block 813).

Table 1 illustrates example channel feedback size in bits for the example embodiments (TCQ based FB with selective FB) versus two standardized channel feedback techniques for a variety of MIMO configurations. As shown in Table 1, TCQ based FB with selective FB provides full channel state information feedback with significantly smaller channel feedback size. As an illustrative example, with a 20 MHz current WiFi OFDM symbol, there are 64 subcarriers per symbol. The number of output bits for the 4 branch-per-state trellis is two bits, and one bit is added as the indicator of the sample having high quantization error or not. The number of bits will be multiplied with the MIMO size and then by 2 (for the real and imaginary parts, respectively). An initial state indication (or initial state information) is added one time to the final FB size, where 6 bits are needed for a 64 state trellis. Thus, for 3×3 MIMO size in the Table 1 as an example, the following is obtained: the total TCQ based BF FB bits=(2+1; output of TCQ+one bit indication for the missing part)*64*(2; separation of real and imaginary part)*3*3+(6; indication of initial state)→ 3*64*2*3*3+6=3462 bits. The feedback overhead is still reduced by a factor of ⅕.

parameter having a quantization error that exceeds a threshold. Sample identifying unit 926 is configured to reconstruct the channel parameters from the quantized channel parameters and compare the two to determine the quantization errors. A feedback generating unit 928 is configured to generate the channel feedback, which includes the quantized channel parameters and a plurality of indicators. Each indicator indicates if an associated sample channel parameter is associated with a quantized channel parameter that has a quantization error that exceeds a threshold. A memory 930 is configured to store signals, a trellis, VAs, convolutional encoders, channel parameters, reconstructed channel parameters, quantization errors, a plurality of indicators, channel feedback, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while channel estimating unit 920, mapping unit 922, quantizing unit 924, sample identifying unit 926, and feedback generating unit 928 may be software modules executing in a microprocessor (such as processor 915) or a custom circuit or a custom compiled logic array of a field programmable logic array. Channel estimating unit 920, mapping unit 922, quantizing unit 924, sample identifying unit 926, and feedback generating unit 928 may be modules stored in memory 930.

TABLE 1

| | Total feedback size in bits for 20 MHz Wi-Fi packet per OFDM symbol. | | | | | | | | |
|---|---|---|---|---|---|---|---|---|---|
| MIMO | TCQ based FB with selective | Full CSI FB based on 802.11n (bits) | | | | Angle quantized V FB based on 802.11ac (bits) | | | |
| Size | FB (bits) | 4 | 5 | 6 | 8 | 1 | 2 | 3 | 4 |
| 2 × 2 | 1542 | 4480 | 5504 | 6528 | 8576 | 640 | 1280 | 2560 | 5120 |
| 3 × 3 | 3462 | 9600 | 11904 | 14208 | 18816 | 1920 | 3840 | 7680 | 15360 |
| 4 × 2 | 3078 | 8576 | 10624 | 12672 | 16768 | 3072 | 6144 | 12288 | 24576 |
| 4 × 4 | 6150 | 16768 | 20864 | 24960 | 33152 | 3840 | 7680 | 15360 | 30720 |

Figure 9:
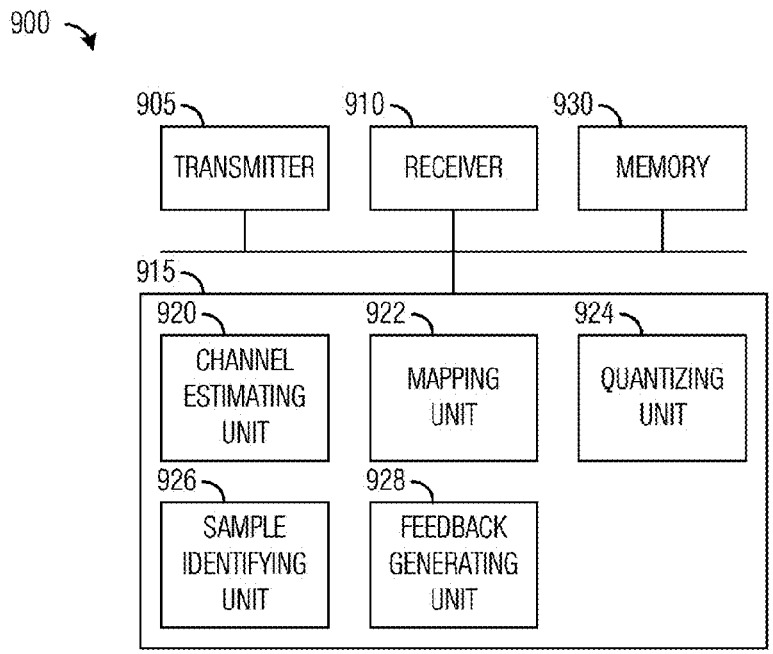
FIG. 9 illustrates an example first communications device according to example embodiments described herein.

FIG. 9 illustrates an example first communications device 900. Communications device 900 may be an implementation of a reception device, such as a station, a user equipment, a terminal, a subscriber, a mobile station, and the like on a downlink or an AP, a base station, a NodeB, an evolved NodeB (eNB), a controller, a communications controller, and the like, on an uplink. Communications device 900 may be used to implement various ones of the embodiments discussed herein. As shown in FIG. 9, a transmitter 905 is configured to transmit packets, channel feedback, and the like. Communications device 900 also includes a receiver 910 that is configured to receive packets, signals, and the like.

Figure 10:
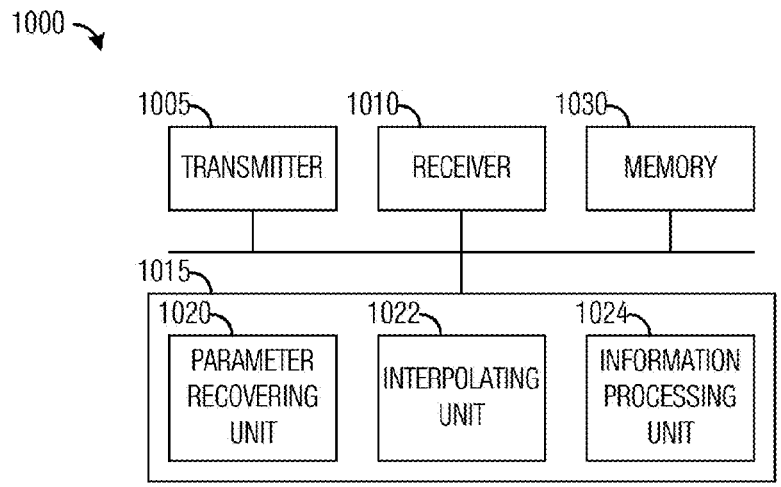
FIG. 10 illustrates an example second communications device according to example embodiments described herein.

A channel estimating unit 920 is configured to generate channel estimates in accordance with channel measurements made using a received signal, such as a reference signal. A mapping unit 922 is configured to map channel parameters to a trellis using a TCQ scheme. A quantizing unit 924 is configured to quantize channel parameters using a VA. A sample identifying unit 926 is configured to identify samples of the channel parameters associated with a quantized channel FIG. 10 illustrates an example second communications device 1000. Communications device 1000 may be an implementation of a transmission device, such as a station, a user equipment, a terminal, a subscriber, a mobile station, and the like on uplink or an AP, a base station, a NodeB, an evolved NodeB (eNB), a controller, a communications controller, and the like, on a downlink. Communications device 1000 may be used to implement various ones of the embodiments discussed herein. As shown in FIG. 10, a transmitter 1005 is configured to transmit packets, signals, and the like. Communications device 1000 also includes a receiver 1010 that is configured to receive packets, channel feedback, and the like.

A parameter recovering unit 1020 is configured to recover channel parameters from quantized channel parameters received in channel feedback. Parameter recovering unit 1020 uses a convolutional encoder to recover the channel parameters. Parameter recovering unit 1020 also uses a plurality of indicators to determine which samples of the channel parameters are associated with quantized channel parameters having quantization errors exceeding a threshold. An interpolating unit 1022 is configured to use an interpolation algorithm to interpolate a replacement sample channel parameter for each indicated sample of the channel parameter associated with a quantized channel parameter having a quantization error exceeding a threshold. Parameter recovering unit 1020 uses the interpolated samples to replace the indicated samples. An information processing unit 1024 uses the recovered channel parameters to adjust transmitter 1005 to transmit to a reception point. A memory 1030 is configured to store signals, convolutional encoders, recovered channel parameters, a plurality of indicators, channel feedback, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while parameter constructing unit 1020, interpolating unit 1022, and information processing unit 1024 may be software modules executing in a microprocessor (such as processor 915) or a custom circuit or a custom compiled logic array of a field programmable logic array. Parameter constructing unit 1020, interpolating unit 1022, and information processing unit 1024 may be modules stored in memory 1030.

Although the present disclosure and its advantages have been described in detail, it should be understood that various changes, substitutions and alterations can be made herein without departing from the spirit and scope of the disclosure as defined by the appended claims.

What is claimed is:

1. A method for providing channel feedback, the method comprising:
   receiving, by a reception point (RP), a signal from a transmission point (TP);
   estimating, by the RP, channel parameters from the signal as received;
   mapping, by the RP, the estimated channel parameters to a trellis in accordance with a Trellis Coded Quantization (TCQ) scheme;
   applying, by the RP, a Viterbi algorithm (VA) to the trellis to generate quantized channel parameters, the quantized channel parameters including a plurality of samples;
   identifying, by the RP, samples of the estimated channel parameters associated with samples of quantized channel parameters having quantization errors above a predetermined threshold;
   generating, by the RP, indicators in accordance with the samples having the quantization error above the predetermined threshold; and
   transmitting, by the RP, the quantized channel parameters and the indicators to the TP.

2. The method of claim 1, wherein identifying the samples of the quantized channel parameters comprises:
   generating reconstructed channel parameters from the quantized channel parameters;
   determining a quantization error for each sample of the estimated channel parameters in accordance with the reconstructed channel parameters; and
   selecting the samples of the estimated channel parameters having quantization errors exceeding the predetermined threshold.

3. The method of claim 2, wherein selecting the samples comprises selecting the samples of the estimated channel parameters having quantization errors exceeding a specified percentile.

4. The method of claim 3, wherein selecting the samples the estimated channel parameters having quantization errors exceeding the specified percentile comprises:
   sorting the samples of the estimated channel parameters in accordance with to the quantization errors, thereby producing sorted samples; and
   identifying the specified percentile of the sorted samples as the samples of the estimated channel parameters having quantization errors exceeding the specified percentile.

5. The method of claim 2, wherein generating the reconstructed channel parameters comprises applying a convolutional encoder to the quantized channel parameters.

6. The method of claim 2, wherein determining the quantization error comprises subtracting the estimated channel parameters from the reconstructed channel parameters.

7. The method of claim 1, further comprising normalizing the estimated channel parameters.

8. The method of claim 1, wherein the trellis includes branches labeled as $\sin((\pi/2)*Q)/\sqrt{N_{TX}/2}$, where $N_{TX}$ is a number of transmit antennas at the TP, and Q is a number of scalar quantization points mapped onto each state of the trellis and each branch of the trellis.

9. The method of claim 1, further comprising transmitting initial state information.

10. The method of claim 1, wherein each one of the indicators is set to a first value if an associated sample has a quantization error above the predetermined threshold, and wherein each one of the indications is set to a set to a second value if the associated sample has a quantization error not above the predetermined threshold.

11. A method for operating a transmission point (TP), the method comprising:
   receiving, by the TP, channel information for a communications channel, the channel information including quantized channel parameters and indicators of identified samples of estimated channel parameters having quantization errors above a predetermined threshold;
   generating, by the TP, reconstructed channel parameters from the quantized channel parameters;
   interpolating, by the TP, replacement samples for the identified samples; and
   replacing, by the TP, the identified samples in the reconstructed channel parameters with the replacement samples to produce recovered channel parameters of the communications channel.

12. The method of claim 11, further comprising adjusting a transmitter of the TP in accordance with the recovered channel parameters.

13. The method of claim 11, wherein the channel information further comprises initial state information.

14. The method of claim 11, wherein generating the reconstructed channel parameters comprises applying a convolutional encoder to the quantized channel parameters.

15. A reception point comprising:
   a receiver configured to receive a signal from a transmission point (TP);
   a processor operatively coupled to the receiver, the processor configured to estimate channel parameters from the signal as received, to mapping the estimated channel parameters to a trellis in accordance with a Trellis Coded Quantization (TCQ) scheme, to apply a Viterbi algorithm (VA) to the trellis to generate quantized channel parameters, the quantized channel parameters including a plurality of samples, to identify samples of the estimated channel parameters associated with samples of quantized channel parameters having quantization errors above a predetermined threshold, and to generate indicators in accordance with the samples having the quantization error above the predetermined threshold; and a transmitter operatively coupled to the processor, the transmitter configured to transmit the quantized channel parameters and the indicators to the TP.

16. The reception point of claim 15, wherein the processor is configured to generate reconstructed channel parameters from the quantized channel parameters, to determine a quantization error for each sample of the estimated channel parameters in accordance with the reconstructed channel parameters, and to select the samples of the estimated channel parameters having quantization errors exceeding the predetermined threshold.

17. The reception point of claim 16, wherein the predetermined threshold is a specified percentile, wherein the processor is configured to sort the samples of the estimated channel parameters in accordance with to the quantization error, and identify the specified percentile of the sorted samples as the samples the estimated channel parameters having quantization errors exceeding the specified percentile.

18. The reception point of claim 16, wherein the processor is configured to select the samples of the estimated channel parameters having quantization errors exceeding a specified percentile.

19. The reception point of claim 15, wherein the processor is configured to normalize the estimated channel parameters.

20. The reception point of claim 15, wherein the transmitter is configured to transmit initial state information.

21. A transmission point comprising:

a receiver configured to receive channel information for a communications channel, the channel information including quantized channel parameters and indicators of identified samples of estimated channel parameters having quantization errors above a predetermined threshold; and a processor operatively coupled to the receiver, the processor configured to generate reconstructed channel parameters from the quantized channel parameters, to interpolate replacement samples for the identified samples, and to replace the identified samples in the reconstructed channel parameters with the replacement samples to produce recovered channel parameters of the communications channel.

22. The transmission point of claim 21, wherein the processor is configured to adjust a transmitter of the transmission point in accordance with the recovered channel parameters.

23. The transmission point of claim 21, wherein the processor is configured to apply a convolutional encoder to the quantized channel parameters.

* * * * *